July 16, 1968     A. H. WILLINGER     3,392,836
AQUARIUM WATER CONDITIONING APPARATUS
Filed July 15, 1966
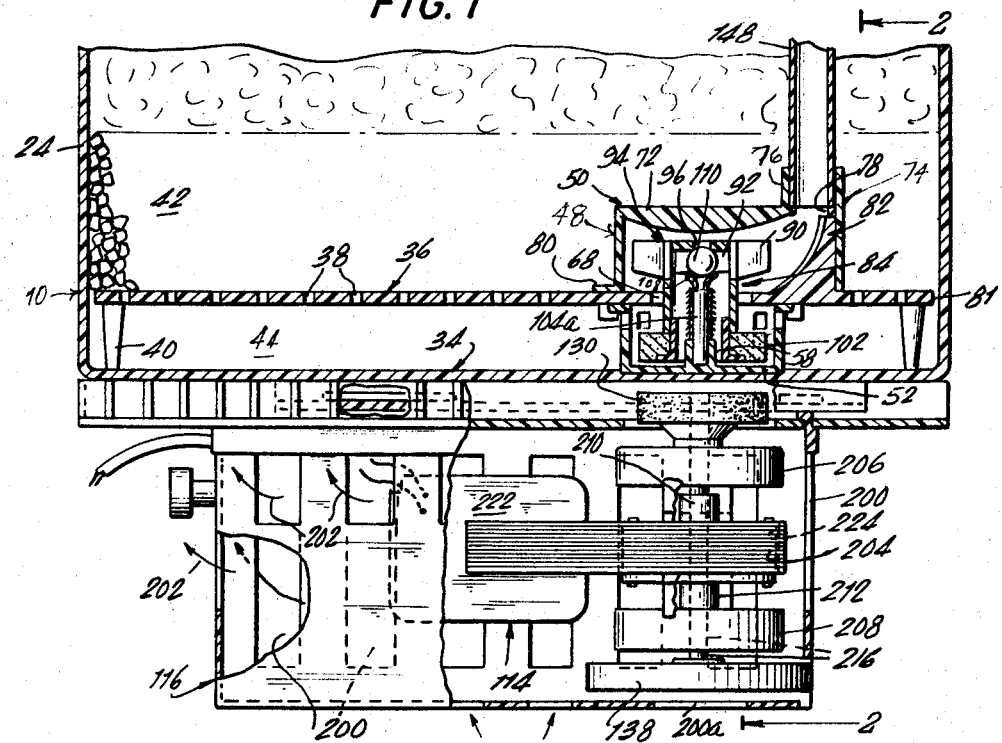
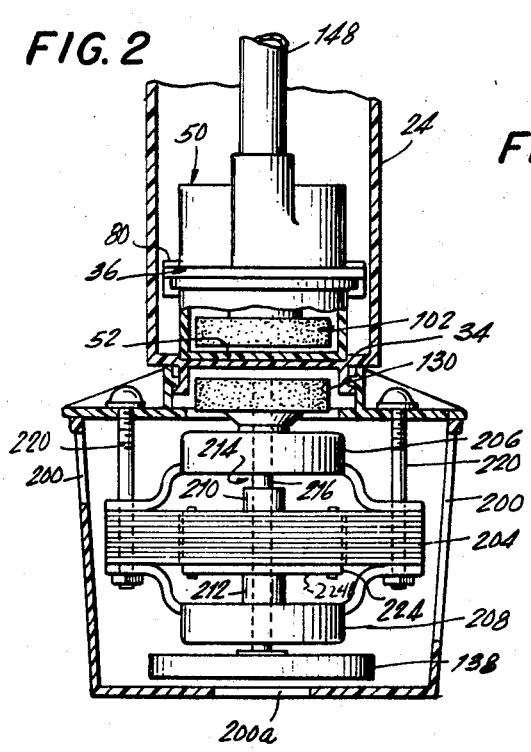
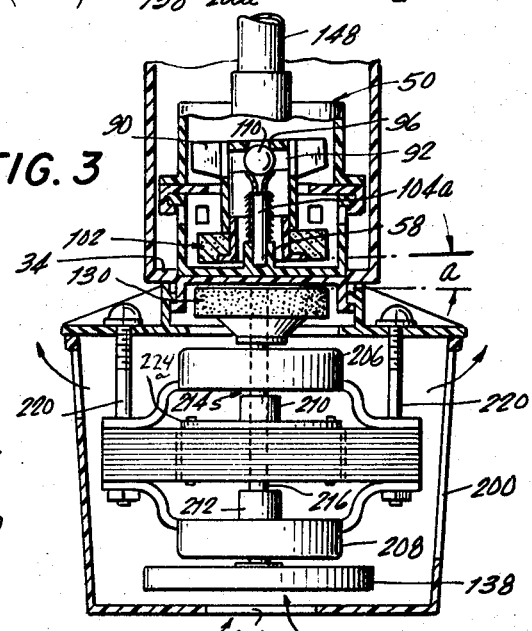
INVENTOR.
ALLAN H. WILLINGER
By Freedman & Goodman
ATTORNEYS

United States Patent Office 3,392,836
Patented July 16, 1968

3,392,836
AQUARIUM WATER CONDITIONING APPARATUS
Allan H. Willinger, New Rochelle, N.Y., assignor to Aquariums Incorporated, Maywood, N.J., a corporation of Delaware
Continuation-in-part of application Ser. No. 376,105, June 18, 1964. This application July 15, 1966, Ser. No. 565,444
1 Claim. (Cl. 210—169)

ABSTRACT OF THE DISCLOSURE

The disclosure and invention relate to a water conditioning device for use in the aquarium hobby including a housing for an aquarium filter apparatus adapted to direct the heat given off by the filter pump around the filter receptacle and aquarium. Also included herein is an improved motor provided with a magnet on a rotor assembly operable to be in elevated floating condition when in operation.

---

This application is a continuation, in part, of my copending application Ser. No. 376,105, filed June 18, 1964, and entitled, Aquarium Filter Apparatus, now U.S. Patent No. 3,321,081, issued May 23, 1967.

In my copending application there has been described an aquarium water circulation and filtration device for use in connection with the aquarium hobby, wherein water circulation through the device and an aquarium is accomplished by means of a pump which is operated by means of an electrical motor which is magnetically coupled thereto through a wall of the device.

In the aquarium hobby it has been found desirable under many circumstances to circulate aquarium water particularly for the purpose of aeration and filtration. The hobby also requires that the water in the aquarium tank be maintained at a relatively constant temperature which in a "community" aquarium is considered to be within the range of 70° and 75°. To accomplish the foregoing purposes, heaters of various types have been devised for immersion in the aquarium tank. Such heaters are usually under thermostatic control and, consequently, are intermittent in operation, permitting the water temperature to fluctuate within the operating range of the thermostat. The requirement for filtration, aeration and temperature control has necessitated the use of a multiplicity of pieces of equipment, with the attendant inconvenience, expense and, in many cases, inefficiency of operation.

In the aforesaid copending application Ser. No. 376,105, there is disclosed a highly novel and efficient water circulation and filtration device for aquariums, wherein a receptacle is provided to be mounted externally of the aquarium tank and houses a filtration arrangement. The receptacle is also provided with pumping means which induces the circulation of water from the aquarium through the filtration arrangement within the receptacle and returns it to the aquarium in a continuous flow in filtered condition. A significant feature of the invention is that the pump is operated by means of a motor disposed externally of the receptacle and is magnetically coupled thereto. Since a motor-pump arrangement in an application of this type requires continuous operation over an extended period of time, the reduction of motor bearing heat and friction and consequent bearing wear to a minimum is imperative. It is also extremely important that vibration of the pump unit and attendant wear and noise from such sources as magnetic field imbalance, misalignment and the like in the motor coupling be reduced to a minimum. It is further highly desirable that apparatus requirements for the maintenance of the aquarium in filtered, aerated and thermally stable condition be kept at a minimum.

It is, therefore, an object of this invention to provide an improved magnetic coupling arrangement for an apparatus of the type disclosed in my copending application, wherein motor bearing friction is reduced to a minimum, as has been the degree of noise or vibration resulting from the pumping operation.

The instant invention also has the significant object of eliminating the necessity for separate aquarium heating devices under many conditions, while maintaining the aquarium water in a thermally stable condition within the desired temperature range. This object is attained by utilizing the heat generated in the pump operating motor for establishing a heated atmosphere surrounding the filtration receptacle.

Other and further objects and advantages of the present invention will become more readily apparent to one skilled in the art from a consideration of the following specification, taken in connection with the appended drawing.

In the drawing which illustrates the best mode presently contemplated for carrying out the invention:

FIGURE 1 is a fragmentary, vertical sectional view, partly broken away, of an aquarium water conditoner, pursuant to the present invention;

FIGURE 2 is a sectional view, partly broken away, taken along line 2—2 of FIGURE 1; and FIGURE 3 is a sectional view similar to FIGURE 2 showing the pump and motor units in operating condition.

Referring now to the drawing in detail, there is shown an aquarium water circulating and filtering device such as is generally shown and described in my aforementioned application, the disclosure of which is herein incorporated by reference. The aquarium water conditioning device is designated generally by the numeral 10 and is of the external type, and, as here shown, comprises a receptacle 24 which is adapted to be suspended on the outer surface of an aquarium tank by well known means, not here shown.

The filter receptacle 24 is essentially of rectangular conformation and is provided with a bottom wall 34 on which there is mounted a platform 36. The platform is provided with a plurality of perforations or slots 38 and is provided at several locations thereof with legs 40. The legs 40 dispose the rectangular platform 36 in spaced relation above the bottom wall 34 of the filter receptacle as shown in FIGURE 1. The platform, when seated within the filter receptacle, serves to define with the latter a pair of chambers 42 and 44. Chamber 44 is defined below the platform 36 and is referred to as a clean water chamber, and the chamber 42 defined above the platform is referred to as a filter chamber.

The platform 36 mounts a centrifugal pump arrangement which is generally indicated by the reference numeral 48, and comprises an upper housing member 50 and a lower cooperating member 52. The lower housing member is a cylindrical element having a substantially circular bottom wall and is mounted on the lower surface of the platform 36 by means of hangers extending from its vertically disposed cylindrical bounding wall. The bounding wall is apertured to define water ports or passages through the lower housing member 52. An aperture 68 in the platform 36 provides a passage between the upper and lower housing members. The bottom wall of lower housing member 52 is also provided with an upwardly extending central bearing seat 58.

The upper housing member 50 is a cylindrical element having a substantially circular top wall 72 from which there depends a cylindrical vertical wall. The top wall 72 is provided eccentrically thereof with an integral, upwardly extending tubular segment 76. The tubular extension 76 is provided with a circular shoulder or detent 78, upon which the water return tube 148 rests. At the free marginal edge thereof, the vertical wall 74 is provided with a lateral flange 80.

The platform 36 which is provided with the previously described aperture 68 adjacent one end 81 thereof, is provided also between said aperture and said end with an integral, upwardly extending water-flow-directing portion 82. The upper housing member 50 is mounted on the upper surface of the platform 36 immediately above the lower housing 52, so as to define the pump housing 48 therewith. More specifically, the flange 80 of the upper housing member 50 is suitably secured in a substantially permanent manner, as by a suitable adhesive or solvent bond, to the upper surface of the platform 36. The lower housing member 52 may be similarly secured to the lower surface of the platform 36, or it may be removably mounted by means of the hangers as is more fully described in my copending application. In this connection, it will be understood that the platform 36 and each of the upper and lower housing members are preferably formed, as by molding or otherwise, form a suitable plastic. The receptacle 24 is also formed of a suitable material for a filter housing, preferably a molded plastic.

Consequently, it will be apparent that with the upper housing member 50, substantially permanently secured to the upper surface of the platform 36 and with the lower housing member 52 removably secured to the lower surface of the platform 36, so that the upper and lower housing members are in vertical alignment with the aperture 68 therebetween, there is defined the previously mentioned pump casing 48.

As here shown, the movable parts of the pump 46 comprise an impeller 84 and a magnetic rotor 102. The impeller 84 comprises a hollow shaft having, as here shown, three radially-spaced, outwardly extending integral impeller blades 90. Each impeller blade 90 is provided with an inwardly extending fin 92. The blades and fins are preferably formed integral with the shaft, the entire impeller being preferably molded from a suitable plastic material. Consequently, it will be apparent that the impeller 84 comprises a hollow shaft which is open at the lower end thereof and which is provided at the upper end thereof with a wall in which there is defined a central aperture 96, the impeller having three radially-related, outwardly extending impeller blades 90 at the closed upper end thereof, and there also being provided three radially-related fins 92 which extend into the hollow interior of the shaft at the upper end thereof, there being a fin 92 continuous with impeller blade 90.

As here shown, the magnetic rotor 102 comprises a preferably ceramic magnet which is mounted on a hollow, preferably plastic, sleeve. The ceramic magnet is of well known construction and, more specifically, the magnet is of the type which is polarized with alternate north and south poles on the lower face thereof. It will be noted that the hollow sleeve extends above the upper surface of the magnet and the magnetic rotor is assembled with the impeller 84 by frictionally engaging the projecting portion of the sleeve into the hollow shaft through the open bottom thereof, it being understood that the sleeve will have a relatively tight adhesive or solvent bonded engagement within the hollow shaft.

Provision is made for a bearing assembly for the rotor impeller assembly 84–102. Said bearing assembly comprises a vertically extending bearing shaft preferably formed by a metal ferrule 104a having a top flange 108 on which there is mounted a ball 110 preferably formed of hard rubber or a suitable plastic.

In order to mount the impeller rotor assembly, the vertical bearing shaft 104a is seated within the previously described bearing seat 58, the lower end of the shaft extending into the seat. The ball 110 is urged or forced into position so that it is firmly seated or engaged between the inner ends or free ends of the three radially-related, inwardly extending fins 92, it being noted that the bearing shaft 104a extends through the rotor sleeve and the hollow impeller shaft. Consequently, it will be apparent that the ball 110 which is frictionally engaged with the fins 92 of the impeller 84 mounts both the latter and the rotor 102 on the head 108 of the bearing shaft 104a.

In order to operate the centrifugal pump 46, provision is made for an electric motor 114. The motor 114 is mounted within a motor housing 116. The motor 114 is provided with a shaft 216 at the upper end of which there is mounted a ceramic magnet 130 which is disposed by the shaft 216 within an upwardly-raised portion of the housing 116. It will be understood that the magnet 130 is the same type of magnet as the previously mentioned magnet 102, preferably a ceramic magnet which is oppositely polarized at its outer face or upper face. The housing 116 is placed to secure optimum magnetic coupling between the magnets 130 and 102, so as to provide maximum coupling between the confronting faces of said magnets.

The motor 114 is of the squirrel-cage type comprising a laminated stator which carries a field coil 222. The motor rotor assembly 224 is also of laminar construction and is rotatably mounted within the stator field by means of a vertically disposed motor shaft 216 which is received within the upper and lower end bearings 206 and 208, respectively. The upper end of motor shaft 216 carries the motor magnet 130 which is mounted thereon for rotation therewith. The lower end of the motor rotor shaft is provided with a synchronizing wheel 138 which is advantageously provided with radial fan blades extending between its hub and rim for aiding in the circulation of air about the motor particularly as the air enters aperture 200a in the bottom wall of housing 116. Motor shaft 216 is also provided with upper and lower thrust bearings 210 and 212, respectively. These bearings are slidably mounted on the motor rotor shaft above and below the rotor laminations and are provided with planar end faces which form the thrust bearing surfaces. The spacing between the exposed face laminations 224a and 224b of the motor rotor 224 and the end bearings 206 and 208 with which they are respectively in confronting relation exceeds the axial dimension of each of the thrust bearings so that the motor rotor shaft is free for movement in a vertical direction to the extent of this difference in dimensions. Thus, as may be seen from FIGURES 1 and 2, the lower thrust bearing 212 will normally rest upon the upper face of end bearing 208 and carries the weight of the rotor assembly since the lowermost lamination 224b of the motor rotor rests upon the upper face of the same thrust bearing 212. The upper thrust bearing carries no weight and merely rests against the upper face lamination 224a being spaced from the upper end bearing as indicated by the arrow 214. If a motor were to be operated in this condition considerable friction would be generated in the region of the end faces of the lower thrust bearing. It is a feature of the present invention that this friction is reduced if not entirely eliminated by the provision of the magnetic coupling between the motor and pump units. As may be more clearly seen from FIGURE 3, when the motor is placed in operation the magnetic attraction between the impeller rotor magnet 102 and the motor magnet 130 elevates the entire motor rotor assembly 224 and tends to retain it in free floating condition. From said figure it will be seen that in operation the lifting of the rotor assembly causes the lowermost lamination 224b of the motor rotor 224 to be lifted away from and out of contact with the lower thrust bearing, the elevation causing a reduction in the spacing from that shown by the arrow 214 in FIGURE 2 to that shown by the arrow 214s in FIGURE 3. The "free floating" effect accomplished by the magnet coupling arrangement thus eliminates the thrust bearing friction which would normally accompany the operation of a motor of this type in a position wherein the motor shaft is vertically disposed. Continuous operation of the motor over extended periods of time is thus possible with minimum motor wear.

An additional significant feature of the present invention resides in the provision of a single ball-bearing suspension for the impeller rotor of the pump arrangement. As has heretofore been set forth, the impeller 84 and its associated magnetic rotor 102 are disposed within the pump housing. The bearing ball rests in the depression formed by the top flange 108 of the metal ferrule 104a. This arrangement permits the entire impeller rotor assembly to swing upon the pivot thus formed and eliminates the vibration which would usually be attendant upon the use of a magnetic coupling wherein the confronting magnets are face polarized. It has been found that in commercial magnetization of the magnetic faces, it is impossible to achieve a precisely balanced or equal magnetization of the face poles. As a consequence of this the attractive force between the confronting magnets comprising the coupling are unequal tending to cause displacement of the axis of rotation of the impeller rotor assembly as the device rotates causing considerable vibration. The uni-ball bearing suspension of the assembly has eliminated this cause of vibration. The operation of the device under the unbalanced magnetic conditions described is illustrated in FIGURE 3. From said figure it will be apparent that when the motor is in operation the face of the motor magnet 130 is disposed in a horizontal plane. The impeller rotor magnet 102, on the other hand, by reason of the uni-ball suspension, has departed from true parallelism with the motor magnet by the angle A indicated in said FIGURE 3. The tilting of the axis of rotation of the entire impeller rotor assembly 84–102 and its constant rotation at the assumed angle without vibration are accomplished by reason of the single ball suspension heretofore described. The magnetic imbalance resulting from conditions in the manufacture and magnetization of the magnets is thus compensated for automatically to the degree required as between any pair of magnets and a significant source of vibration and wear is thereby eliminated. The degree of tilt will, of course, depend upon the degree of imbalance for which compensation is required.

An additional significant feature of the present invention resides in the fact that the arrangement provides a heat source for maintaining the water in the aquarium tank at a relatively constant temperature under the usual conditions encountered in the aquarium hobby. In this respect it has heretofore been indicated that an appropriate temperature range for a "community" tank is considered to be between 70° F. to 75° F. Some hobbyists consider 72° F. to be ideal. To this end it is customary to provide a heating device immersed in the aquarium water which is thermostatically controlled and activated when the water temperature falls below the desired level. The instant invention permits the elimination of said extraneous heating device under usual conditions in a domestic residence by utilizing the heat generated by the motor to maintain the aquarium water at a stable temperature within the desired range. It has been found that by locating the motor in proximity to the filter receptacle, in this case directly below it, it is possible to utilize the heat normally unavoidably generated by the motor for the purpose of bathing the receptacle and its fluid contents in convection currents of air above the ambient temperature of the room in which the tank is located. To this end, the motor housing 116 is provided with apertured walls as indicated by the numerals 200 and 200a, permitting the room air to be circulated through the housing and about the motor and to escape in the form of convection currents of heated air as indicated by the arrows 202. A certain amount of air impinges upon the wall of the aquarium tank and may have some temperature elevating effect. The principal heated air currents are, however, directed about the filter receptacle, bathing it in the heated atmosphere thus provided, which heat is then transferred to the water circulating through the receptacle. It has been found that the arrangement wherein the circulating water is thus heated permits the achievement of a stable thermal condition after the aquarium water conditioning device has been in operation for a relatively short period of time and that once stabilized the stable condition is maintained at the desired level, eliminating the necessity of any additional heat source under many of the conditions which would normally require an extraneous heater. Where excessive ambient temperatures are encountered an extraneous heat source may still be used but the capacity of said heat source and the demands placed upon it are reduced to a minimum.

Water from the aquarium tank is introduced into the receptacle by means of a conventional siphon tube, not shown, and recirculated into the aquarium tank through tube 146.

It will be understood that various changes and modifications may be made in the apparatus as described herein without, however, departing from the basic inventive concept of the present nivention, as set forth in the appended claim.

I claim:

1. In an aquarium water conditioning device comprising a filter receptacle for receiving water from an aquarium tank, filtering it and restoring the same to the tank in filtered condition, pump means for circulating the aquarium water in the manner indicated, electric motor means for operating said pump means, said motor means having a housing provided with at least one air inlet port in the bottom thereof and at least one air exit port positioned above said air inlet port and operable to direct exiting air upwards and against and around said filter receptacle in direct heat transfer relation therewith and in indirect heat transfer relation with the aquarium water circulating therethrough.

References Cited

UNITED STATES PATENTS

| | | | |
|---|---|---|---|
| 2,515,538 | 7/1950 | Wall | 210—169 |
| 2,669,668 | 2/1954 | Okulitch et al. | |
| 2,927,537 | 3/1960 | Hunter. | |
| 3,273,717 | 9/1966 | Canterbury | 210—169 |

SAMIH N. ZAHARNA, *Primary Examiner.*

REUBEN FRIEDMAN, *Examiner.*

F. W. MEDLEY, *Assistant Examiner.*